United States Patent Office 3,036,079
Patented May 22, 1962

3,036,079
METHYL RESERPATE-18-DESOXY-18-PHOSPHATES AND RELATED COMPOUNDS
Robert Armistead Lucas, Mendham, N.J., assignor to Ciba Corporation, a corporation of Delaware
No Drawing. Filed Feb. 3, 1960, Ser. No. 6,359
5 Claims. (Cl. 260—287)

The present invention concerns compounds derived from deserpidic acids. More particularly, it relates to compounds of the formula

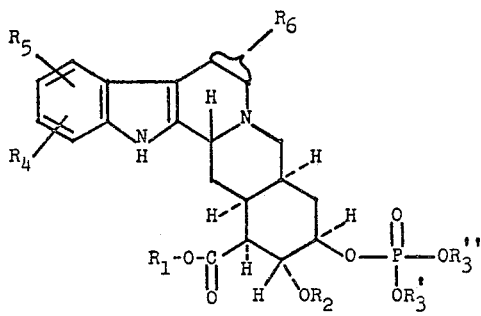

in which $R_1$ represents lower alkyl, lower alkoxy-lower alkyl or tertiary amino-lower alkyl, $R_2$ stands for lower alkyl, each of the radicals $R_3'$ and $R_3''$ represents an aliphatic hydrocarbon radical, a carbocyclic aryl radical or a carbocyclic aryl-aliphatic hydrocarbon radical, each of the radicals $R_4$ and $R_5$ stands for hydrogen, lower aliphatic hydrocarbon, or a functional group, such as, for example, etherified hydroxyl, esterified hydroxyl, etherified mercapto, nitro, amino, halogeno or halogeno-lower alkyl, or, when attached to adjacent positions and taken together, for lower alkylene-dioxy, and $R_6$, attached to either one of the positions 5 or 6, stands for hydrogen or lower alkyl, salts or N-oxides thereof, as well as process for the preparation of such compounds.

A lower alkyl group $R_1$, containing from one to seven, preferably from one to four, carbon atoms, stands, for example, for methyl, ethyl, n-propyl, isopropyl, n-butyl, isobutyl, as well as n-pentyl, isopentyl, n-hexyl and the like.

In a lower alkoxy-lower alkyl group $R_1$, the lower alkoxy portion contains from one to four carbon atoms and represents, for example, methoxy, ethoxy, n-propyloxy, isopropyloxy, n-butyloxy and the like. The amino group of a tertiary amino-lower alkyl radical $R_1$ is primarily an N,N-di-lower alkyl-amino group, in which lower alkyl contains from one to four carbon atoms, e.g. N,N-dimethylamino, N-ethyl-N-methyl-amino, N,N-diethylamino, N,N-di-n-propylamino, N,N - di - isopropylamino and the like, as well as a 1-N,N-lower alkyleneimino group, in which lower alkylene contains from four to six ring carbon atoms, e.g. 1-pyrrolidino, 1-piperidino, 1-hexamethyleneimino and the like, a 1-N,N-lower oxaalkylene-imino group, in which lower oxa-alkylene contains preferably four ring carbon atoms, e.g. 1-morpholino and the like, or a 1-N,N-lower aza-alkylene-imino group, in which lower aza-alkylene contains preferably four ring carbon atoms, e.g. 4-methyl-1-piperazino and the like.

The lower alkyl portion of a lower alkoxy-lower alkyl or a tertiary amino-lower alkyl radical $R_1$ may be represented by a lower alkylene radical containing from two to seven carbon atoms, which separates the lower alkoxy group or the amino group from the carbon atom of the carboxy group by at least two carbon atoms. Preferably, the lower alkylene radical contains from two to three carbon atoms and separates the lower alkoxy and the amino group from the carboxy group by the same number of carbon atoms. Such radicals are primarily 1,2-ethylene, 1-methyl-1,2-ethylene, 2-methyl-1,2-ethylene or 1,3-propylene; other lower alkylene radicals may be, for example, 1,4-butylene or 1-methyl-1,3-propylene and the like.

The lower alkyl group $R_2$, containing from one to four carbon atoms, stands for ethyl, n-propyl, isopropyl, n-butyl, isobutyl and the like, but represents, above all, methyl.

Each of the radicals $R_3'$ and $R_3''$ represents primarily an aliphatic hydrocarbon radical, particularly lower alkyl containing from one to seven, especially from one to four, carbon atoms, e.g. methyl, ethyl, n-propyl, isopropyl, n-butyl, isobutyl, secondary butyl, or tertiary butyl, as well as n-pentyl, isopentyl, neopentyl, n-hexyl, isohexyl, n-heptyl and the like. Other suitable aliphatic hydrocarbon radicals are, for example, lower alkenyl, such as vinylic lower alkenyl, e.g. vinyl, 1-propenyl and the like, or allylic lower alkenyl, e.g. allyl, 2-methyl-allyl, 2-butenyl and the like, lower alkynyl, e.g. ethynyl, 2-methyl-ethynyl and the like, cycloaliphatic hydrocarbon, particularly cycloalkyl, containing from three to seven, especially from five to six, ring carbon atoms, e.g. cyclopentyl, cyclohexyl, cycloheptyl and the like, cycloalkyl-lower alkyl, in which cycloalkyl contains from three to seven such carbon atoms, e.g. cyclopentylmethyl, 1-cyclopentylethyl, cyclohexylmethyl, 2-cyclohexylethyl and the like, or any other suitable aliphatic hydrocarbon radical.

$R_3'$ and/or $R_3''$ may also represent a carbocyclic aryl radical, particularly monocyclic carbocyclic aryl, e.g. phenyl or substituted phenyl, as well as a carbocyclic aryl-aliphatic hydrocarbon radical, particularly monocyclic carbocyclic aryl-lower alkyl, such as phenyl-lower alkyl, e.g. benzyl, 1-phenylethyl, 2-phenylethyl and the like, or substituted phenyl-lower alkyl. One or more than one of the same or of different substituents may be attached to any of the available positions; such substituents are for example, lower alkyl, e.g. methyl, ethyl and the like, etherified hydroxy, such as lower alkoxy, e.g. methoxy, ethoxy and the like, esterified hydroxy, particularly halogeno, e.g. fluoro, chloro, bromo and the like, nitro, amino, particularly N,N-di-lower alkyl-amino, e.g. N,N-dimethylamino, N,N-diethylamino and the like, halogeno-lower alkyl, e.g. trifluoromethyl and the like, or any other suitable substituent. Preferably the radicals $R_3'$ and $R_3''$ have the same meaning, but may also stand for different substituents.

The substituents $R_4$ and $R_5$ may represent hydrogen or any of the previously-mentioned groups. Such groups are, for example, lower aliphatic hydrocarbon, primarily lower alkyl containing from one to four carbon atoms, e.g. methyl, ethyl, n-propyl, isopropyl and the like, or functional groups, such as, for example, etherified hydroxy, particularly lower alkoxy containing from one to four carbon atoms, e.g. methoxy, ethoxy, n-propyloxy, isopropyloxy, n-butyloxy, isobutyloxy and the like, as well as cycloalkyloxy, e.g. cyclopentyloxy, cyclohexyloxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy and the like, esterified hydroxyl, particularly lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkyl-mercapto containing from one to four carbon atoms, e.g. methylmercapto, ethylmercapto and the like, nitro, amino, particularly N,N-disubstituted amino, such as N,N-di-lower alkyl-amino, e.g. N,N-dimethylamino, N,N-diethylamino and the like, halogeno, e.g. fluoro, chloro, bromo, iodo and the like, halogeno-lower alkyl, e.g. trifluoromethyl and the like, or any other suitable functional group. Whenever attached to two adjacent positions, the radicals $R_4$ and $R_5$, when taken together, may also form a cyclic substituent; such substituent may be represented, for example, by lower alkylenedioxy, e.g. methylenedioxy, or any other analogous substituent. The substituents $R_4$ and $R_5$ may be attached to any of the positions available in the six-membered carbocyclic aryl nucleus.

The radical $R_6$ stands preferably for hydrogen; when representing lower alkyl, such radical may stand for methyl, as well as ethyl and the like.

Salts of the compounds of this invention are primarily therapeutically acceptable acid addition salts with inorganic or organic acids, particularly with mineral acids, e.g. hydrochloric, hydrobromic, sulfuric, phosphoric acids and the like.

Due to the presence of a tertiary amino group in the molecule, the compounds may also form N-oxides.

In view of the fact that several asymmetric carbon atoms are present in the compounds of this invention, the latter may be obtained in the form of a mixture of racemates, racemates or optically pure compounds.

The new compounds of this invention have antihypertensive properties, as well as sedative and tranquilizing effects on the central nervous system. In addition, quantitative differences may be observed within the group of the new compounds of this invention. For example, when compared with the ratio existing between antihypertensive and sedative effects in naturally occurring Rauwolfia alkaloids, such as, for example, reserpine, deserpidine, rescinnamine and the like, some of the compounds of this invention have more predominant sedative effects with negligible antihypertensive activity, whereas in others, the latter may be more pronounced than the sedative and tranquilizing component.

The compounds of the present invention may, therefore, be used as antihypertensive agents to relieve hypertensive conditions, such as, for example, benign or malignant hypertension, renal hypertension or hypertension associated with pregnancy, such as toxemia of pregnancy, and/or as sedative agents to relieve states of hyperactivity, tension and agitation, as, for example, associated with mental disturbances and the like. They may also be used as intermediates for the formation of other useful compounds.

Very pronounced antihypertensive and/or sedative effects are exhibited by compounds of the formula

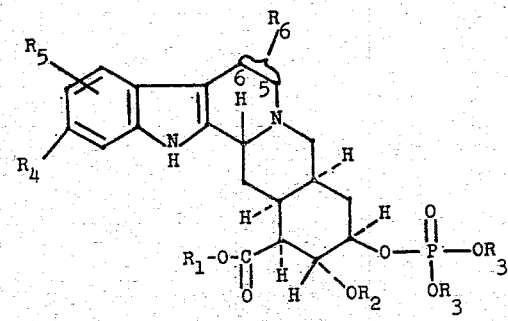

in which $R_1$ represents lower alkyl containing from one to four carbon atoms, lower alkoxy-lower alkyl, in which lower alkoxy contains from one to four carbon atoms and lower alkyl, containing from two to three carbon atoms, separates lower alkoxy from the carboxy group by from two to three carbon atoms, or N,N-di-lower alkyl-amino-lower alkyl, in which lower alkyl of the N,N-di-lower alkyl-amino portion contains from one to four carbon atoms, and lower alkyl, separating N,N-di-lower alkyl-amino from the carboxy group by two to three carbon atoms, contains from two to three carbon atoms, $R_2$ represents lower alkyl containing from one to four carbon atoms, $R_3$ represents lower alkyl containing from one to seven carbon atoms, each of the radicals $R_4$ and $R_5$ stands for hydrogen, lower alkyl containing from one to four carbon atoms, lower alkoxy containing from one to four carbon atoms, lower alkyl-mercapto containing from one to four carbon atoms, or halogeno, $R_6$, attached to one of the positions 5 or 6, stands for hydrogen or lower alkyl containing from one to four carbon atoms, the therapeutically useful mineral acid addition salts or the N-oxides of these compounds, as well as their various isomeric forms.

This group of compounds is represented, for example, by lower alkyl reserpate compounds of the formula

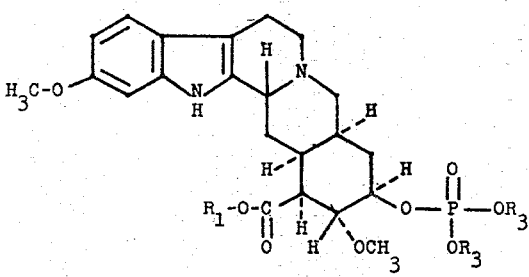

in which $R_1$ represents lower alkyl containing from one to four carbon atoms and $R_3$ represents lower alkyl containing from one to four carbon atoms, e.g. methyl, ethyl, n-propyl, isopropyl, n-butyl, isobutyl, secondary butyl or tertiary butyl, or the N-oxides thereof, whereby these compounds may be in different isomeric forms. Specific members illustrating this group of compounds are esters of methyl reserpate with hydrogen di-lower alkyl phosphates, e.g. the ester of methyl reserpate with hydrogen dimethyl phosphate, the ester of methyl reserpate with hydrogen diethyl phosphate, the ester of methyl reserpate with hydrogen di-n-propyl phosphate, the ester of methyl reserpate with hydrogen di-isopropyl phosphate, the ester of methyl reserpate with hydrogen di-n-butyl phosphate, the ester of methyl reserpate with hydrogen di-isobutyl phosphate, the ester of methyl reserpate with hydrogen di-secondary butyl phosphate or the ester of methyl reserpate with hydrogen di-tertiary butyl phosphate, esters of ethyl reserpate with hydrogen di-lower alkyl phosphate, e.g. the ester of ethyl reserpate with hydrogen dimethyl phosphate, the ester of ethyl reserpate with hydrogen diethyl phosphate, the ester of ethyl reserpate with hydrogen di-isopropyl phosphate, the ester of ethyl reserpate with hydrogen di-n-butyl phosphate and the like, esters of n-propyl reserpate with hydrogen di-lower alkyl phosphate, e.g. the ester of n-propyl reserpate with hydrogen dimethyl phosphate, the ester of n-propyl reserpate with hydrogen diethyl phosphate, the ester of n-propyl reserpate with hydrogen di-n-butyl phosphate and the like, esters of isopropyl reserpate with hydrogen di-lower alkyl phosphate, e.g. the ester of isopropyl reserpate with hydrogen dimethyl phosphate, the ester of isopropyl reserpate with hydrogen diethyl phosphate, the ester of isopropyl reserpate with hydrogen di-n-butyl phosphate and the like, esters of n-butyl reserpate with hydrogen di-lower alkyl phosphates, e.g. the ester of n-butyl reserpate with hydrogen dimethyl phosphate, the ester of n-butyl reserpate with hydrogen diethyl phosphate and the like, or any other esters of lower alkyl reserpates with hydrogen di-lower alkyl phosphates.

Also included are, for example, esters of lower alkyl deserpidates, lower alkyl 5-methyl-deserpidates, lower alkyl 6-methyl-reserpates, lower alkyl 9-methoxy-deserpidates, lower alkyl 10-methoxy-deserpidates, lower alkyl 10-methoxy-reserpates, lower alkyl 11-ethoxy-desperidates, lower alkyl 12-methoxy-deserpidates, lower alkyl 10-chloro-deserpidates, lower alkyl 10-bromo-reserpates, lower alkyl 11-methylmercapto-deserpidates, lower alkyl 17-desmethoxy-17-ethoxy-reserpates and the like, with hydrogen di-lower alkyl phosphates, e.g. hydrogen dimethyl phosphate, hydrogen diethyl phosphate, hydrogen di-n-propyl phosphate, hydrogen di-isopropyl phosphate, hydrogen di-n-butyl phosphate and the like.

The compounds of this invention may be used as medicaments in the form of pharmaceutical preparations, which contain the new compounds in admixture with a pharmaceutical organic or inorganic, solid or liquid carrier suitable for enteral or parenteral administration. For making up the preparations there can be employed substances which do not react with the new compounds, such as water, gelatine, lactose, starches, magnesium stearate, stearyl alcohol, talc, vegetable oils, benzyl alcohols, gums, waxes, propylene glycol, polyalkylene glycols or any other known carrier for medicaments. The pharmaceutical preparations may be in solid form, for example, as tablets, dragees, capsules and the like, or in liquid form, for example, as solutions, suspensions, emulsions and the like. If desired, they may contain auxiliary substances, such as preserving, stabilizing, wetting or emulsifying agents and the like, salts for varying the osmotic pressure, buffers and the like. They may also contain, in combination, other therapeutically useful substances. The compounds of this invention may also be used in compositions for veterinary use by adding them to standard feed formulae.

The compounds of the present invention may also be employed as intermediates for the preparation of other useful compounds.

The compounds of the present invention may be prepared by reacting a deserpidate compound of the formula

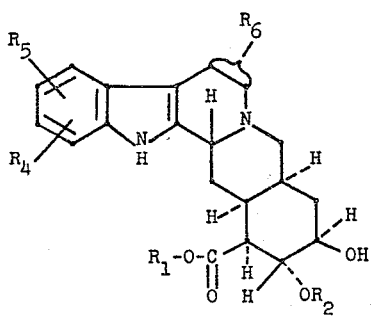

in which $R_1$, $R_2$, $R_4$, $R_5$ and $R_6$ have the previously-given meaning, or an N-oxide thereof, with a phosphoryl halide compound of the formula

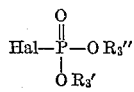

in which $R_3'$ and $R_3''$ have the previously given meaning, and Hal stands for halogen, and, if desired, separating a resulting mixture of isomeric compounds into the single isomers, and/or, if desired, converting a resulting compound into a salt or an N-oxide thereof.

Hal in the phosphoryl halide reagent of the above given formula stands primarily for chloro, but may also represent fluoro or bromo and the like.

The esterification reaction may be carried out according to known methods, for example, in the presence of an acid adsorbent, preferably of an organic base containing a tertiary nitrogen atom, particularly a monocyclic azacyclic aryl compound, e.g. pyridine, picoline, collidine, lutidine and the like, as well as N,N,N-tri-lower alkylamines, e.g. N,N,N-trimethylamine, N-ethyl-N,N-dimethyl-amine, N,N-diethyl-N-methyl-amine, N,N,N-triethylamine, N,N,N-tri-n-propylamine and the like, N,N-di-lower alkyl-N-monocyclic aryl-amine, e.g. N,N-dimethylaniline, N,N-diethyl-aniline and the like, or any other suitable organic base. If desired, inorganic basic salts, such as, for example, alkali metal carbonates, e.g. sodium carbonate, potassium hydrogen carbonate and the like, may replace the above-mentioned organic bases.

Liquid bases, such as those mentioned herein above, may simultaneously serve as diluents; other solvents, which may be used in the esterification procedure are, for example, halogenated lower alkanes, e.g. methylene chloride, chloroform, ethylene chloride, tetrachloroethane and the like, formamides, e.g. N,N-dimethylformamide and the like, or any other suitable inert solvent.

The desired compounds may be isolated from the reaction mixture according to standard procedures, e.g. by dilution of the reaction mixture, for example, with water, with an aqueous solution of an alkali metal carbonate, e.g. sodium carbonate potassium carbonate and the like, or any other suitable diluent, and subsequent extraction of the desired compound with an organic solvent, or by any other suitable isolation procedure. It may be purified, for example, by adsorption on an adsorbent, e.g. aluminum oxide, a magnesia silicagel preparation and the like, and subsequent elution, recrystallization and the like.

The deserpidate compounds used as the starting materials are known or, if new, may be prepared according to procedures used for known analogous compounds. For example, deserpidic acids may be esterified by treatment with a lower diazoalkane, a lower alkoxy-lower diazoalkane or a tertiary amino-lower diazoalkane, or by alcoholysis of deserpidic acid (16→18)-lactones with a lower alkanol, a lower alkoxy-lower alkanol or a tertiary amino-lower alkanol in the presence of an alcoholysis catalyst.

For example, to a solution of the diazo reagent in an inert solvent, such as an ether, particularly diethylether, may be added the deserpidic acid compound or a salt thereof, which is preferably kept in a suspension or a solution, for example, of a lower alkanol, e.g. methanol, ethanol and the like, a hologenated lower aliphatic hydrocarbon, e.g. chloroform, methylene chloride and the like, or any other suitable, inert solvent. Or, the diazo compound may be distilled out of a solution, such as a diethylether solution, into the suspension or solution of a deserpidic acid compound or a salt thereof. An excess of the diazo derivative present in the reaction mixture may be destroyed, for example, by adding an additional carboxylic acid, e.g. acetic, benzoic acid and the like. The esterification may be carried out under cooling or at room temperature, and, if desired, under the atmosphere of an inert gas, e.g. nitrogen.

Or, by treating a deserpidic acid lactone campound with a lower alkanol, a lower alkoxy-lower alkanol or a tertiary amino-lower alkanol in the presence of a catalyst, for example, an alkali metal, e.g. sodium and the like, compound of the alcoholysis alcohol, or any other catalyst, e.g. potassium cyanide, benzyl trimethyl ammonium hydroxide and the like, the desired deserpidate compound may be obtained. Although this reaction may proceed under cooling or at room temperature, the mixture is advantageously heated, if necessary, in the atmosphere of an inert gas, e.g. nitrogen.

N-oxides of the starting material may be prepared according to known N-oxidation methods; for example, a solution of the starting material in an inert solvent may be treated with a per-acid, such as, for example, peracetic, perbenzoic, monoperphthalic, p-toluene persulfonic acid and the like, with hydrogen peroxide or with ozone and the like.

The compounds prepared according to the process of this invention may be obtained in the form of the free bases or the salts thereof. A salt may be converted into the free base by reacting the former with an alkaline reagent, such as, for example, silver carbonate, aqueous ammonia, or any other suitable alkaline reagent. A free base may be converted into its therapeutically useful acid addition salts by reaction with one of the acids mentioned hereinbefore; such reaction may be carried out, for example, by treating a solution of the base in a solvent, such as a lower alkanol, e.g. methanol, ethanol, propanol, isopropanol and the like, with the appropriate acid or a solution thereof, and isolating the formed salt.

N-oxides of the compounds of the present invention may be formed according to known methods; for example, the resulting deserpidate compound, preferably a solution thereof in an inert solvent, may be reacted with an N-oxidizing reagent, such as, for example, with hydrogen peroxide, ozone, persulfuric acid and the like, or more especially, with organic peracids, such as organic percarboxylic acids, e.g. peracetic, perbenzoic, monoperphthalic acid and the like, or organic persulfonic acids, e.g. p-toluene persulfonic acid and the like. Inert solvents are, for example, monocyclic carboxylic aryl hydrocarbons, e.g. benzene, toluene and the like, halogenated lower alkanes, e.g. chloroform, ethylene chloride and the like, lower alkanols, e.g. methanol, ethanol and the like, or any other suitable solvent. In the N-oxidation reaction an excess of the oxidation reagent and/or an increase in temperature should be avoided in order to prevent oxidative degradation.

Depending on the form of starting materials used in the formation of compounds of the present invention, the latter may be obtained in the form of different isomers. Thus, racemic or optically active deserpidic acid derivatives may be used as starting materials whereby the latter is preferably used in the optically active form, particularly when derived from natural sources. Resulting racemates may be resolved into the optically active forms, the laevo-rotatory $p$-form and the dextro-rotatory $\alpha$-form. Resolution procedures may be carried out according to known methods suitable for the separation of racemates. For example, to a solution of the free base of a racemate (a $\alpha,p$-compound) in a solvent, such as a lower alkanol, e.g. methanol, ethanol, isopropanol and the like, a lower alkanone, e.g. acetone, ethyl methyl ketone and the like, or any other suitable solvent, or a mixture of solvents, is added one of the optically active forms of an acid containing an asymmetric carbon atom, or a solution thereof, for example, in the same lower alkanol, lower alkanone, other solvent, or solvent mixture mentioned hereinabove. Salts, which are formed by the optically active forms of the base with the optically active form of the acid may then be isolated, primarily on the basis of their different solubilities. Useful as optically active forms of salt-forming acids having an asymmetric carbon atom, are, for example, the $\alpha$-tartaric acid (L-tartaric acid) and the $p$-tartaric acid (D-tartaric acid), as well as the optically active forms of dibenzoyl tartaric, di-p-toluyl-tartaric, malic, mandelic, 10-camphor sulfonic acid, quinic acid and the like. The free and optically active base may be obtained from a resulting salt according to methods known for the conversion of a salt into a base, as, for example, is outlined hereinbefore. An optically active base may be converted into a therapeutically useful acid addition salt with one of the acids mentioned hereinbefore, or may be converted into an N-oxide described hereinbefore. The optically active forms may also be isolated by biochemical methods.

The invention also comprises any modification of the process wherein a compound obtainable as an intermediate at any stage of the process is used as starting material and the remaining step(s) of the process is(are) carried out. It also includes any new intermediates, which may be formed in one of the procedures outlined hereinbefore.

In the process of this invention such starting materials are preferably used which lead to final products mentioned in the beginning as preferred embodiments of the invention.

The following examples illustrate the invention and are not to be construed as being limitations thereon. Temperatures are given in degrees centigrade.

*Example 1*

A mixture of 2.07 g. of methyl reserpate, 1.05 g. of diethyl phosphoryl chloride and 25 ml. of pyridine is allowed to stand in a stoppered flask at room temperature for about sixteen hours. The reaction mixture is poured into 400 ml. of an ice-cold, 10 percent aqueous sodium carbonate solution. After standing for several hours the granular precipitate is filtered off, washed with water and dissolved in methylene chloride. The resulting solution is filtered through a short column containing a magnesia silicagel adsorbent (as described, for example, in U.S. Patent No. 2,393,625) and evaporated to dryness under reduced pressure. The desired ester of methyl reserpate with hydrogen diethyl phosphate is obtained by recrystallization of the residue from ethyl acetate, M.P. 167–169°; yield: 2.0 g.

Methyl reserpate may be replaced in the above reaction by other lower alkyl, lower alkoxy-lower alkyl, or N,N-di-lower alkyl-amino-lower alkyl deserpidate compounds, which may be reacted with diethyl phosphoryl chloride; compounds, which may be formed in such reaction are, for example, the ester of ethyl reserpate with hydrogen diethyl phosphate, the ester of n-propyl reserpate with hydrogen diethyl phosphate, the ester of isopropyl reserpate with hydrogen diethyl phosphate, the ester of n-butyl reserpate with hydrogen diethyl phosphate, the ester of methyl deserpidate with hydrogen diethyl phosphate, the ester of methyl 5-methyl-deserpidate with hydrogen diethyl phosphate, the ester of methyl 5-methyl reserpate with hydrogen diethyl phosphate, the ester of methyl 10-methoxy-deserpidate with hydrogen diethyl phosphate, the ester of methyl 10-methoxy-reserpate with hydrogen diethyl phosphate, the ester of methyl 12-methoxy-deserpidate with hydrogen diethyl phosphate, the ester of methyl 10-chloro-deserpidate with hydrogen diethyl phosphate, the ester of methyl 10-bromo-deserpidate with hydrogen diethyl phosphate, the ester of methyl 17-desmethoxy-17-ethoxy-reserpate with hydrogen diethyl phosphate, the ester of 2-methoxyethyl reserpate with hydrogen diethyl phosphate, the ester of 2-ethoxyethyl reserpate with hydrogen diethyl phosphate, the ester of 2-N,N-dimethylaminoethyl reserpate with hydrogen diethyl phosphate and the like.

Substitution of dimethyl phosphoryl chloride di-n-propyl phosphoryl chloride, di-isopropyl phosphoryl chloride, di-n-butyl phosphoryl chloride and the like for the diethyl phosphoryl chloride in the above procedure and treatment of methyl reserpate with these di-lower alkyl phosphoryl halides as shown in the above example, results in the formation of the ester of methyl reserpate with hydrogen dimethyl phosphate, the ester of methyl reserpate with hydrogen di-n-propyl phosphate, the ester of methyl reserpate with hydrogen di-isopropyl phosphate, the ester of methyl reserpate with hydrogen di-n-butyl phosphate and the like.

*Example 2*

A mixture of 3.3 g. of methyl reserpate and 2.5 g. of diphenyl phosphoryl chloride in 40 ml. of pyridine is allowed to stand at room temperature for sixteen hours and is then poured into a cold, 10 percent aqueous solution of sodium carbonate. The resulting granular precipitate is filtered off after several hours, is washed with water and dissolved in methylene chloride. The solution is passed through a short column containing a magnesia silica adsorbent (as described in Example 1), and is evaporated to dryness; the residue is recrystallized from ethyl acetate containing a small amount of diethyl ether. The ester of methyl reserpate with hydrogen diphenyl phosphate melts at 192–193°; yield: 4.0 g.

What is claimed is:
1. A member of the group consisting of compounds of the formula

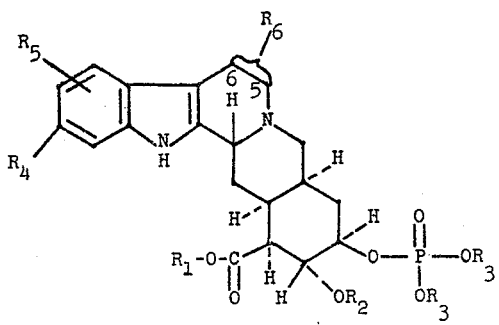

in which $R_1$ represents a member of the group consisting of lower alkyl, lower alkoxy-lower alkyl in which lower alkyl separates lower alkoxy from the carboxy group by from two to three carbon atoms, and N,N-di-lower alkyl-amino-lower alkyl in which lower alkyl separates N,N-di-lower alkyl-amino from the carboxy group by from two to three carbon atoms, $R_2$ represents lower alkyl, $R_3$ stands for lower alkyl, each of the groups $R_4$ and $R_5$ represents a member of the group consisting of hydrogen, lower alkyl, lower alkoxy, lower alkyl-mercapto and halogeno, and $R_6$, attached to one of the positions 5 and 6, stands for a member of the group consisting of hydrogen and lower alkyl, therapeutically acceptable mineral acid addition salts and N-oxides thereof.

2. The ester of lower alkyl reserpate with hydrogen di-lower alkykl phosphate.

3. The ester of methyl reserpate with hydrogen di-lower alkyl phosphate.

4. The ester of methyl reserpate with hydrogen diethyl phosphate.

5. The ester of methyl reserpate with hydrogen diphenyl phosphate.

References Cited in the file of this patent

UNITED STATES PATENTS

| | | |
|---|---|---|
| 2,789,113 | Taylor | Apr. 16, 1957 |
| 2,857,385 | Kuehne | Oct. 21, 1958 |
| 2,929,817 | Joly et al. | Mar. 22, 1960 |

FOREIGN PATENTS

| | | |
|---|---|---|
| 184,580 | Austria | Feb. 10, 1956 |